United States Patent
Moniri et al.

(10) Patent No.: US 12,434,134 B2
(45) Date of Patent: Oct. 7, 2025

(54) MULTIMODAL SENSOR FUSION FOR BUILDING VIRTUAL GAMEPAD FOR IN-CAR GAMES

(71) Applicant: CERENCE OPERATING COMPANY, Burlington, MA (US)

(72) Inventors: Mohammad Medhi Moniri, Ulm (DE); Erland Unruh, Ulm (DE)

(73) Assignee: Cerence Operating Company, Burlington, MA (US)

( * ) Notice: Subject to any disclaimer, the term of this patent is extended or adjusted under 35 U.S.C. 154(b) by 262 days.

(21) Appl. No.: 18/361,049

(22) Filed: Jul. 28, 2023

(65) Prior Publication Data

US 2025/0032899 A1    Jan. 30, 2025

(51) Int. Cl.
  *A63F 13/213*    (2014.01)
  *A63F 13/215*    (2014.01)
  *A63F 13/803*    (2014.01)

(52) U.S. Cl.
  CPC .......... *A63F 13/213* (2014.09); *A63F 13/215* (2014.09); *A63F 13/803* (2014.09)

(58) Field of Classification Search
  CPC ........ A63F 13/20; A63F 13/21; A63F 13/211; A63F 13/218; A63F 13/24; A63F 13/26; A63F 13/28; A63F 13/50; A63F 13/56; A63F 13/90
  See application file for complete search history.

(56) References Cited

U.S. PATENT DOCUMENTS

| | | | |
|---|---|---|---|
| 8,758,126 B2 | 6/2014 | Bavitz et al. | |
| 10,457,179 B1* | 10/2019 | Kentley-Klay | ........ B60N 2/879 |
| 10,926,173 B2 | 2/2021 | Shah et al. | |
| 11,235,709 B2 | 2/2022 | Lee et al. | |
| 2014/0128144 A1 | 5/2014 | Bavitz et al. | |
| 2020/0377036 A1* | 12/2020 | Lee | ...................... A63F 13/245 |
| 2022/0062752 A1* | 3/2022 | Zeng | .................... B60K 35/235 |
| 2022/0109617 A1 | 4/2022 | Lim et al. | |
| 2022/0176237 A1 | 6/2022 | Moniri et al. | |
| 2022/0219536 A1 | 7/2022 | Reindl | |
| 2022/0288490 A1* | 9/2022 | Kaku | ........................ B60N 2/90 |
| 2023/0180937 A1* | 6/2023 | Kaku | .................... A63F 13/803 |
| | | | 463/47 |

* cited by examiner

*Primary Examiner* — Omkar A Deodhar
(74) *Attorney, Agent, or Firm* — Brooks Kushman, P.C.

(57) ABSTRACT

A vehicle gaming system for a vehicle includes one or more computing devices configured to obtain body gesture data indicative of one or more recognized poses of a user of a video game; obtain speech data indicative of one or more recognized words spoken by the user in a passenger cabin of the vehicle; generate a multimodal gaming input by combining the body gesture data and the speech data; identify one or more game commands for the video game being played from a game command datastore based on the multimodal gaming input; and transmit the one or more game commands to a remote gaming server to obtain gaming codes associated with the one or more game commands to cause the video game to perform an action associated with the one or more game commands.

20 Claims, 3 Drawing Sheets

MULTIMODAL SENSOR FUSION FOR BUILDING VIRTUAL GAMEPAD FOR IN-CAR GAMES

TECHNICAL FIELD

The present disclosure relates to a vehicle gaming system.

BACKGROUND

Vehicles include features and functions to facilitate user enjoyment. Vehicles are no longer just a mode for transportation in which technological advancements focus on the drive experience. Additional focus is now being placed on the overall experience and convenience of passengers of the vehicle including entertainment through movies, music, and/or video games and other infotainment.

SUMMARY

In one form, the present disclosure is directed to a vehicle gaming system for a vehicle. The vehicle gaming system comprises one or more computing devices configured to: obtain body gesture data indicative of one or more recognized poses of a user of a video game; obtain speech data indicative of one or more recognized words spoken by the user in a passenger cabin of the vehicle; generate a multimodal gaming input by combining the body gesture data and the speech data; identify one or more game commands for the video game being played from a game command datastore based on the multimodal gaming input; and transmit the one or more game commands to a remote gaming server to obtain gaming codes associated with the one or more game commands to cause the video game to perform an action associated with the one or more game commands.

In one form, the present disclosure is directed to a method for providing a video gaming system for a vehicle. The method comprises: obtaining body gesture data indicative of one or more recognized poses of a user of a video game; obtaining speech data indicative of one or more recognized words spoken by the user in a passenger cabin of the vehicle; generating a multimodal gaming input by combining the body gesture data and the speech data; identifying one or more game commands for the video game being played from a game command datastore based on the multimodal gaming input; and transmitting the one or more game commands to a remote gaming server to obtain gaming codes associated with the one or more game commands to cause the video game to perform an action associated with the one or more game commands.

In one form, the present disclosure is directed to a vehicle gaming system for a vehicle. The vehicle gaming system comprising: one or more computing devices configured to operate as a vehicle gaming input system and a video game control module. The vehicle gaming input system is configured to: obtain body gesture data indicative of one or more recognized poses of a user of a video game, obtain speech data indicative of one or more recognized words spoken by the user in a passenger cabin of the vehicle, generate a multimodal gaming input by combining the body gesture data and the speech data using supplemental data associated with the body gesture data and the speech data, and identify one or more game commands for the video game being played from a game command datastore based on the multimodal gaming input. The video game control module is configured to execute one or more gaming codes associated with the one or more game commands to cause the video game to perform an action associated with the one or more game commands.

BRIEF DESCRIPTION OF THE DRAWINGS

In order that the disclosure may be well understood, there will now be described various forms thereof, given by way of example, reference being made to the accompanying drawings, in which.

Figure 1:
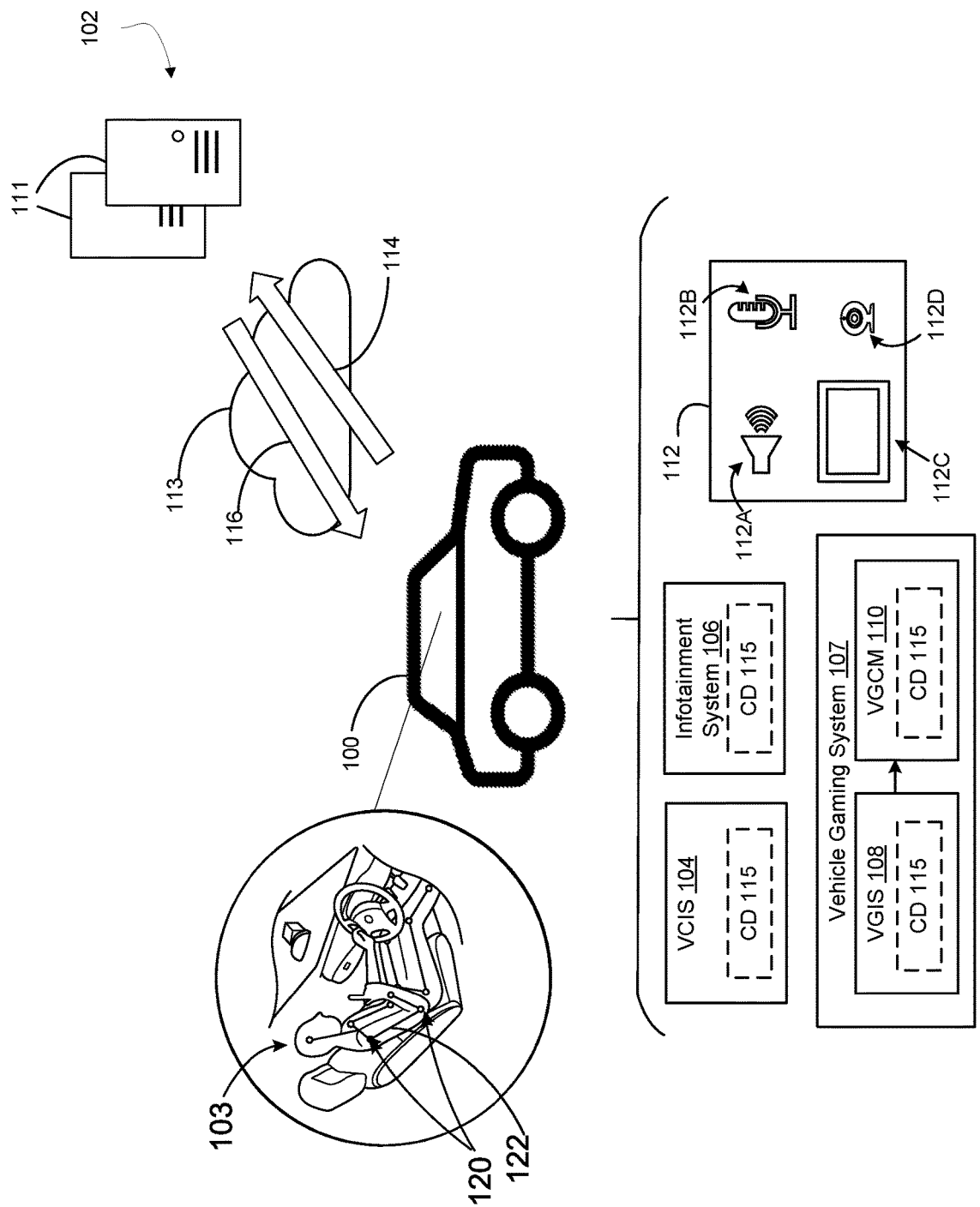
FIG. 1 illustrates a vehicle having a vehicle gaming system and virtual gaming input system in accordance with the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Vehicle entertainment is no longer limited to just music, and has expanded to visual entertainment, such as video games. That is, a vehicle may include a vehicle gaming system to allow a user access to a library of video games. In a non-limiting example, as part of the vehicle, the vehicle gaming system communicates with a gaming server having the library of video games. The video game can be presented on a display device in the vehicle (e.g., a head-up display or a liquid crystal display (LCD)) at the center console, headrest displays, etc. The user is able to play the video game using a dedicated gaming controller (e.g., a physical controller or a software application employed to turn a smartphone into a gaming controller).

Current vehicle gaming systems require the user to have at least one physical controller or even monopolize the smartphone, not allowing the user to access other features of the smartphone while playing the game.

In lieu of using a dedicated gaming controller, a vehicle gaming input system of the present disclosure provides a virtual multiplay gaming experience in which a multimodal gaming input by the user is employed to control the video game. Specifically, utilizing existing devices and/or systems in the vehicle, such as, but not limited to, cameras and/or microphones, the vehicle gaming input system generates the multimodal gaming input based on a body posture and speech of the user, thereby removing the need for a dedicated gaming controller.

Referring to FIG. 1, a vehicle 100 is in communication with a gaming server 102 to provide video gaming capabilities to one or more users 103 of the vehicle 100. In one form, among other systems, the vehicle 100 includes a vehicle communication interface system (VCIS) 104, an infotainment system 106, and a vehicle gaming system 107 including a virtual gaming input system (VGIS) 108 and a video game control module (VGCM) 110. Among other components, each of the systems 104, 106, 108, 110 may include one or more computing devices (CD) 115 having one or more computer hardware processors coupled to one or more computer storage devices storing instructions executable by the processors to perform the respective functions described herein.

The gaming server 102 may be an off-board cloud-based server separate and distinct from the vehicle gaming system 107. In one form, the gaming server 102 includes a database (s) 111 configured to store a plurality of video games accessible by an external system such as the vehicle gaming system 107. A video game is an electronic game that generally involves interaction between a user and an output device providing a digital representation of the electronic game. In a non-limiting example, the video game receives inputs that are associated with defined actions to be presented by the output device, such as, but not limited to: visual action presented on a display device graphics; an audio sound emitted by a speaker; and/or haptic feedback provided by controlled vibrations generated by actuators.

Each video game is defined by a series of commands, and each command is associated with one or more instructions or software code executable by a computing device to present the video game via one or more output device. In one form, the gaming server 102 stores the commands and associated instructions for each video game among the plurality of video games. That is, the gaming server 102 is configured to facilitate in the execution of the video game by providing commands to the vehicle gaming system 107. In another example, the vehicle gaming system 107 may download the entire game from the gaming server 102, and store the video game locally in a memory of the vehicle 100.

As described herein, the gaming server 102 is configured to communicate with the vehicle gaming system 107 via one or more communication networks 113. The networks 113 may be supported by one or more wireless communication protocols/devices including but not limited to cellular networks, Wi-Fi, BLUETOOTH, among others, such as dedicated short-range communications (DSRC). Accordingly, the gaming server 102 includes hardware and software components, such as but not limited to, transceivers, routers, and/or processors to execute selected protocols and communicate via the networks 113.

While the gaming server 102 is described as communicating with the vehicle 100, the gaming server 102 may communicate with other gaming systems that may or may not be in a vehicle. For example, the gaming server 102 may be configured to communicate with gaming systems supported by a smart phone device, or a dedicated console. In addition, the user 103 is able to play a selected video game with others via the gaming server 102.

The vehicle communication interface system 104 is configured to communicate with external systems such as the gaming server 102 via the networks 113. Accordingly, the vehicle communication interface 104 includes hardware and software components, such as but not limited to, transceivers, routers, and/or processors to execute selected protocols. The vehicle communication interface 104 is further configured to communicate with computing devices/system within the vehicle 100 using a vehicle network (e.g., controlled area network (CAN)), thereby allowing the computing devices/systems to exchange data with external devices.

The infotainment system 106 is configured to provide the user 103 access to various auxiliary functions that offer convenient features such as, information, comfort, and entertainment. More particularly, employing one or more interface devices, the infotainment system 106 enables the user 103 to control other vehicle systems such as, the vehicle gaming system 107. In one form, the infotainment system 106 includes interface devices 112 for interacting with the user 103 and/or obtaining information regarding the user 103 like: audio devices (e.g., speaker 112A and/or microphone 112B); display device 112C (e.g., a head-up display and/or a liquid crystal display); and/or a camera 112D.

The following are non-limiting examples of how the various interface devices may be used. In some variations, the infotainment system 106 uses the speaker 112A to emit audio signals, such as, but not limited to: music, information/questions from a digital assistant, and/or audio narrations. In some variations, the infotainment system 106 uses the microphone 112B to obtain audio signals indicative of sounds detected in, for example, a passenger cabin of the vehicle 100, where the audio signals may be processed to detect words/phrases uttered by the user 103. In some variations, the infotainment system 106 employ the display device 112C to present a graphic such as, but not limited to maps, a series of icons, video, and/or pictures. In the event multiple display devices 112C are provided in the vehicle 100, the display device 112C may be operable to present different graphics from other display devices 112C, thereby allowing a first user to view something different than that of a second user. In some variations, the infotainment system 106 employs the camera 112D to obtain image(s), such as still or video images, of the passenger cabin of the vehicle 100. In a non-limiting example, the images from the camera 112D may be processed to identify the user 103 and/or detect a pose or gesture of the user 103, which may be further employed to control various systems of the vehicle 100, such as the vehicle gaming system 107. The camera 112D may be any suitable sensor for capturing images of environment, such as but not limited to: video camera (monochrome and/or color), two-dimensional (2D) camera, three dimensional (3D) scanner providing the image as a 3D point cloud, infrared camera, and/or passive infrared sensor.

The vehicle 100 may be equipped with different types of interface devices 112 and/or one or more of the same interface devices 112. For example, the passenger cabin may include one or more speakers 112A, one or more microphones 112B, one or more display devices, and/or one or more cameras 112D. While specific examples are provided, the infotainment system 106 may include other interfaces, such as an input interface to obtain an input from the user 103 (e.g., a touchscreen provided with a display device 112C, and/or buttons/knobs operable by the user 103).

In an example implementation, the infotainment system 106 may display a menu of available auxiliary function to the user 103 via the display device 112C. The user 103 may select an auxiliary function, such as the video game using a touchscreen, audio command, button, or other suitable interface device. Once selected, the infotainment system 106 notifies the vehicle gaming system 107 via the vehicle network and provides additional information to the user 103, such as a list of available video games based on information from the vehicle gaming system 107. While a specific example is provided herein, it should be readily understood the infotainment system 106 may be configured in various suitable ways to provide information to the user 103 and receive an input from the user 103, and should not be limited to the example provided herein.

The vehicle gaming system 107 is configured to transmit a game command 114 to the gaming server 102 and receive instructions or software codes 116 for executing the action associated with the game command 114 in the video game. More particularly, the virtual gaming input system 108 is configured to provide a desired user input/command for operating the vehicle gaming system 107, and specifically, the video game control module 110. As described herein, the virtual gaming input system 108 is configured to identify a game command 114 using data indicative of behavioral inputs of the user 103, such as, verbal cues and body position of the user 103, and provide the game command 114 to the video game control module 110 to have the video game perform the action associated with the game command 114.

The video game control module 110 is configured to execute and present a video game. Specifically, employing the infotainment system 106, the video game control module 110 presents accessible video games to the user 103 via, for example, the display device 112C. Once a game is selected, the video game control module 110 presents the game via the display device 112C and controls operation of the game based on inputs from the user 103. In some implementations, the video game control module 110 is provided as a software application supported by the gaming server 102. More particularly, in some variations, the video game control module 110 transmits the game command 114 to the gaming server 102 via network 113, which, in return, transmits instructions (e.g., software code) 116 for executing the action at the vehicle. The video game control module 110 then executes the instructions to have the action associated with the game command presented on the display device 112C.

In some variations, the video game control module 110 is configured to store video games accessible by the user, and thus, the game command 114 may be provided directly to the video game control module 110 in lieu of being provided to the gaming server 102. Having video games stored locally at the vehicle 100 may be beneficial in areas having high latency.

As indicated above, current vehicle gaming systems employs a dedicated gaming controller in the form of the user's body commands. In lieu of the dedicated gaming controller, the present disclosure employs the virtual gaming input system 108 for providing the gaming command.

In one form, the game commands 114 are selected based on a multimodal gaming input using a pose and speech of the user 103. Specifically, the virtual gaming input system 108 is configured to obtain body gesture data indicative of one or more poses of the user 103 and speech data indicative of one or more recognized words spoken by the user 103. The virtual gaming input system 108 is configured to generate a multimodal gaming input by fusing or, stated differently, combining the body gesture data and the speech data using supplemental data associated with the body gesture data and the speech data. The supplemental data provides information related to one or more aspects of the data such as but not limited to, timestamp of the data, identification of the originating device that created the data (e.g., identification associated with the microphone 112B capturing audio signals and/or with the camera 112D capturing images), and/or a location of the originating device in the vehicle. Using the multimodal gaming input, the virtual gaming input system 108 identifies one or more game commands 114 for the video game.

Figure 2:
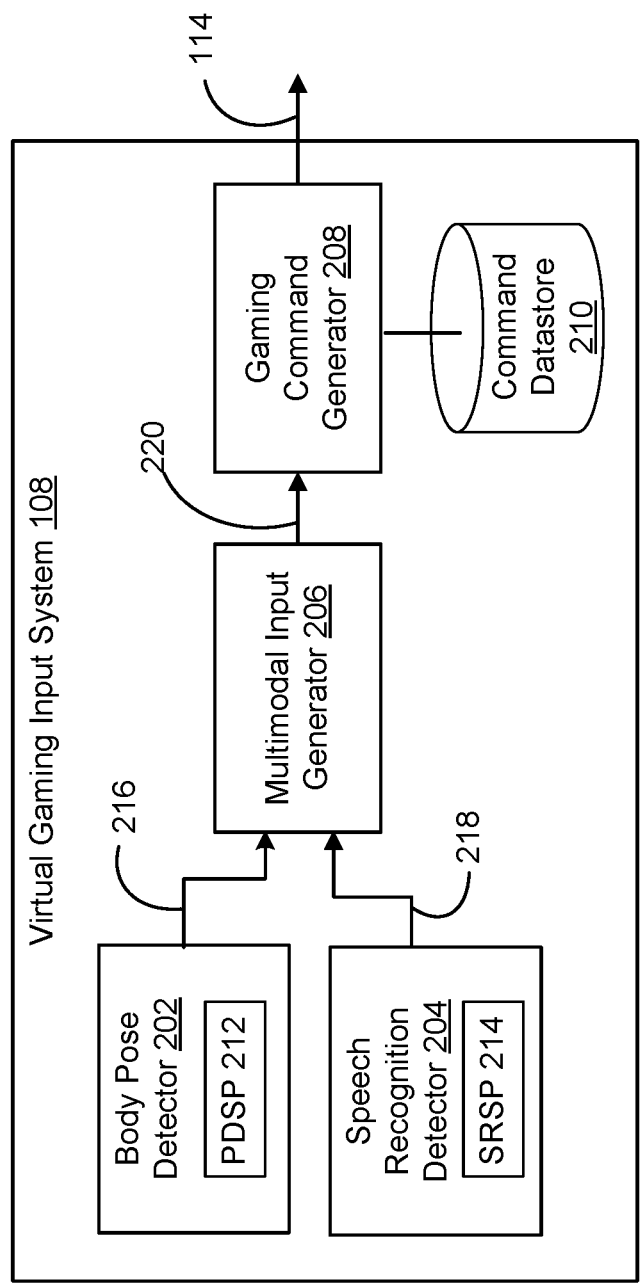
FIG. 2 is a block diagram of the virtual gaming input system of FIG. 1.

Referring to FIG. 2, in one from, the virtual gaming input system 108 includes a body pose detector 202, a speech recognition detector 204, a multimodal input generator 206, and a gaming command generator 208 having a game command datastore 210.

The body pose detector 202 is configured to detect a body pose/posture of the user 103 using data from one or more occupant detector sensors, such as the camera 112D. More particularly, the body pose detector 202 detects physical behavior or more generally, one or more body pose of the passenger such as, but not limited to, direction of user gaze, user gestures, head position, hand movement, and/or arm position.

Using known body pose/gesture detection techniques provided as a pose detection software program (PDSP 212), the body pose detector 202 is configured to detect and track pose and/or motion of the user 103 using images from the camera 112D. In a non-limiting example, referring to FIG. 1, the body pose detector 202 is configured to identify key-points 120 that may be associated with joints of the user 103, and may track movement of the key-points 120 to determine the poser and/or gesture of the user 103. For illustration purposes, the key-points 120 are provided as dots that are connected to each other with segments 122. It should be readily understood that the additional key-points 120 may be identified and should not be limited to those provided in FIG. 1. For example, additional key-points may be identified in the hand of the user 103. In one form, the body pose detector 202 is configured to output pose data 216 indicative of the body pose and supplemental data, such as but not limited to timestamp associated with the detected body pose.

In some variations, the body pose detector 202 may include a learning feature to learn/calculate specific location of the user 103 in the vehicle 100 and the key-points 120 of the user 103. For example, each user 103 may create a profile with the vehicle gaming system 107, and the body pose detector 202 stores information related to physical location of the user 103 in the vehicle 100 which may be provided by the user 103 or may be detected via the camera 112D. The body pose detector 202 may then learn or refine location of key-points 120 detected to improve accuracy of the body pose/gesture. Specific user identification may be used to apply a specific user profile to the body pose detector 202 as well. In one example, a key fob, user device such as a mobile phone, or even data from a biometric sensor, may be used to identify the user 103.

The speech recognition detector 204 is configured to analyze audio signals taken from the vehicle 100 to detect one or more recognized words spoken by the user 103. In a non-limiting example, the speech recognition detector 204 obtains an input audio signal from the microphone 112B in the vehicle 100. The microphones 112B may be part of the vehicle 100 and the audio signal is obtained via the vehicle network. In another example, a dedicated microphone may be provided with the virtual gaming input system 108 to directly provide the audio signal to the speech recognition detector 204.

Employing known speech recognition techniques, the speech recognition detector 204 applies suitable automatic speech recognition techniques provided as a speech recognition software program (SRSP) 214 to recognize words and/or phrases in the input audio signal. For example, the speech recognition detector 204 may use one or more acoustic models, lexicons, grammars, and/or language models. The speech recognition detector 204 is configured to output speech data 218 indicative of the recognized words or phrases detected. The speech recognition detector 204 may also output supplemental data related to the original input audio signal, such as but not limited to, a timestamp.

In some variations, the speech recognition application employed by the speech recognition detector 204 further includes a natural language process model to analyze the words and/or phrases detected to determine a meaning expressed by the words and/or phrases. For example, the user 103 may say the terms "jump over hole" to indicate they wish to have the controlled character to jump or "select portion: to indicate they wish to have the controller character select a particular object. This information can be used to improve the gaming system 102 based on the user 103, and have the gaming system 102 update the action being performed. In a non-limiting example, the natural language process may include one or more ontologies to link words or phrases to concepts the user 103 may express, such as ontologies related to user interface interaction concepts or other tasks the user 103 may request be performed.

The multimodal input generator 206 is configured to receive the pose data 216 and the speech data 218 to generate a multimodal gaming input 220. In one form, the multimodal input generator 206 fuses or, in other words, combines the pose data 216 and the speech data 218 based on the supplemental data, such as the timestamp. Accordingly, the multimodal input generator 206 provides a temporal correlation between the pose and speech of the user 103 as the user control the video game.

The gaming command generator 208 uses the multimodal gaming input 220 to select one or more game commands 114 from a plurality of commands provided in the command datastore 210. More particularly, the command datastore 210 is configured to associate a plurality of defined multimodal gaming inputs with a plurality of defined game commands. In one form, a single game command 114 may be selected using one or more gaming inputs. For example, a game command 114 to move right may be inputted using a right lean gesture, movement of the right hand, verbal statement of "right," or a combination thereof. In another example, the duration of a posture or speech may be used to detect the number of times a selected action is requested. That is, if the user 103 leans right for 2 seconds, such pose may be equated to the user 103 pressing a button 2 times in a second. In yet another example, if the user 103 moves their right hand down and then left while saying the words "down" and "left, the defined multimodal gaming input in the command datastore may only associate the movement of the right hand to a respective command of "move down" and "move right." Therefore, while the multimodal gaming input 220 may include both pose and speech data, only one input may be associated with an actual game command. Each multimodal gaming input 220 includes one or more recognized words, one or more recognized poses, or a combination of one or more recognized words and one or more recognized poses.

In one form, various factors may be considered when identifying a gaming input for a respective game command. In a non-limiting example, factors may include latency of the gaming input, latency/pace of a of the game, availability of standard physical controllers for the game, and/or body pose limitation within the car. With respect to latency, the latency of the gaming input may correlate with the pace of the game, such that a fast-paced game with continuous movement (e.g., a car race game) may utilize a gaming input with lower latency than games having intermittent movement (e.g., an adventure game having breaks). Accordingly, for a high pace game like a car race, the gaming input may be associated with movement of the user's body if it is quicker to detect than movement of the user's finger.

The gaming command generator 208 transmits the identified game command 114 to the gaming server 102, which then transmits instructions or software code 116 to perform the action associated with the game command 114. For example, with respect to the user 103 leaning right for 2 seconds, the command datastore 210 may associate the leaning right to moving forward and indicate that the duration of the lean equates to two steps per second. Accordingly, if the user 103 holds the lean for 2-seconds, the game command generator 208 determines that the game command 114 is to move forward 4-steps, which may be transmitted as four transmissions of the game command 114 associated with moving forward. As provided above, once received, the gaming server 102 transmits instructions for performing the action to the vehicle gaming system 107, where the instructions may include, for example, outputting a specific sound from the speakers 112A and/or presenting one or more graphics on the display device 112C.

In the event the multimodal gaming input 220 is not recognized by the gaming command generator 208, the gaming command generator 208 is configured to notify the user 103 via one or more of the interface devices 112. For example, the gaming command generator 208 is configured to provide an audio message via the speaker 112A and/or via text message presented on the display device 112C, where the message may be "a game command was not recognized."

In another variation, the gaming command generator 208 is configured to associate specific interfaces of the dedicated gaming controller to specifical behavioral mode. In a non-limiting example, the arrows of the dedicated gaming controller may be associated with predefined body poses and the control buttons may be associated with verbal terms.

In some example implementations, the game commands 114 may include general command inputs employable for majority video games supported by the gaming server 102 and/or may include unique commands for specific games (e.g., a game employing avatars may have different command for selection of weapons versus a puzzle game).

In some implementations, the gaming command generator 208 transmits the identified game command 114 to the video gaming control module 110, which in return transmits it to the gaming server 102. In such arrangement, the game command 114 is being provided as if it were from a dedicated physical controller. In another example implementation, the gaming command generator 208 is configured to transmit the game command 114 to the gaming server 102 via the vehicle communication interface system 104, and the video gaming control module 110 executes the instructions/software codes 116 received.

The following provides some variations that may be implemented with the vehicle gaming system 107 and/or the gaming server 102 that may be combined or employed separately.

In some variations, the vehicle gaming system 107 and the gaming server 102 are configured to support multiplayer games in which the user 103 in the vehicle 100 is playing a selected video game with someone that is a fellow passenger of the vehicle 100 and/or someone not in the vehicle 100. For example, with the other user in the vehicle 100, the virtual gaming input system 108 is configured to associate each player with a selected zone of the vehicle 100 (e.g., each seat in the vehicle 100 may be provided as a zone), and use data from microphones 112B and cameras 112D at those selected zone for determining the multimodal gaming input of the user 103. That is, the body pose detector 202 may output a first pose data for the first player and a second pose data for the second player using the supplemental data that provides the identification information of the cameras 112D. Alternatively, if there is one camera that captures images of both players, the body pose detector 202 is configured to define respective zones in the images and then process the data associated with each zone to identify the player and determine the first and second pose data. Similarly, the speech recognition detector 204 may receive data from two separate microphones 112B associated with each of the players, and processes the data to obtain first speech data and a second speech data for the first and second players. Alternatively, the speech recognition detector 204 is configured to receive one audio signal, but is able to distinguish between the voices using voice samples from the users 103. Once obtained, the multimodal input generator 206, generates two multimodal gaming inputs that are provided to the gaming command generator 208 to obtain instructions for each of the players.

In another variation, the body pose detector 202 and speech recognition detector 204 are configured to isolate inputs related to the user 103 of the game from data related to other passengers in the vehicle 100. Similar to the variation above regarding another player, the body pose detector 202 is configured to use data from a selected camera associated with the zone having the user 103, and disregard data from the other cameras. If there is one camera, the body pose detector 202 is configured to identify the user 103 in the image, and generate pose data 216 based on data associated with area of the image having the identified user 103. Similarly, the speech recognition detector 204 may receive data only from the microphone 112B associated with the user 103 to generate the speech data 218. Alternatively, the speech recognition detector 204 is configured to receive one audio signal, but is able to distinguish between voices using, for example, voice samples from occupants of the vehicle 100 including the user 103.

In yet another variation, in lieu of having the virtual gaming input system 108 at the vehicle 100, the virtual gaming input system 108 may be entirely or partially provided at a cloud-based server (not shown). In this variation, data indicative of behavioral inputs of the user 103, such as, verbal cues and body position of the user 103 are transmitted to the remote virtual gaming input system 108 using the network 113, and the virtual gaming input system 108 transmits the command 114 to the video game control module 110.

In yet another variation, the virtual gaming input system 108 is configured to mimic various types of physical gaming controllers, such as gaming controllers for XBOX, PLAYSTATION, among others. Accordingly, behavioral inputs employed for the physical gaming controllers can be associated with same game command.

In yet another variation, voice commands may be generic and/or optimized for specific games or categories of games. For example, if the video game is a race type of game, a more natural verbal phrase like "faster" or "slower" may be associated with a command to increase or decrease speed, than having specific value associated with a body pose (e.g., movement of fingers). In yet another example, a joystick can also be optimized based on number of directions that can be moved (e.g., 1 or 2 axes for movement in 2 or 4 directions).

Figure 3:
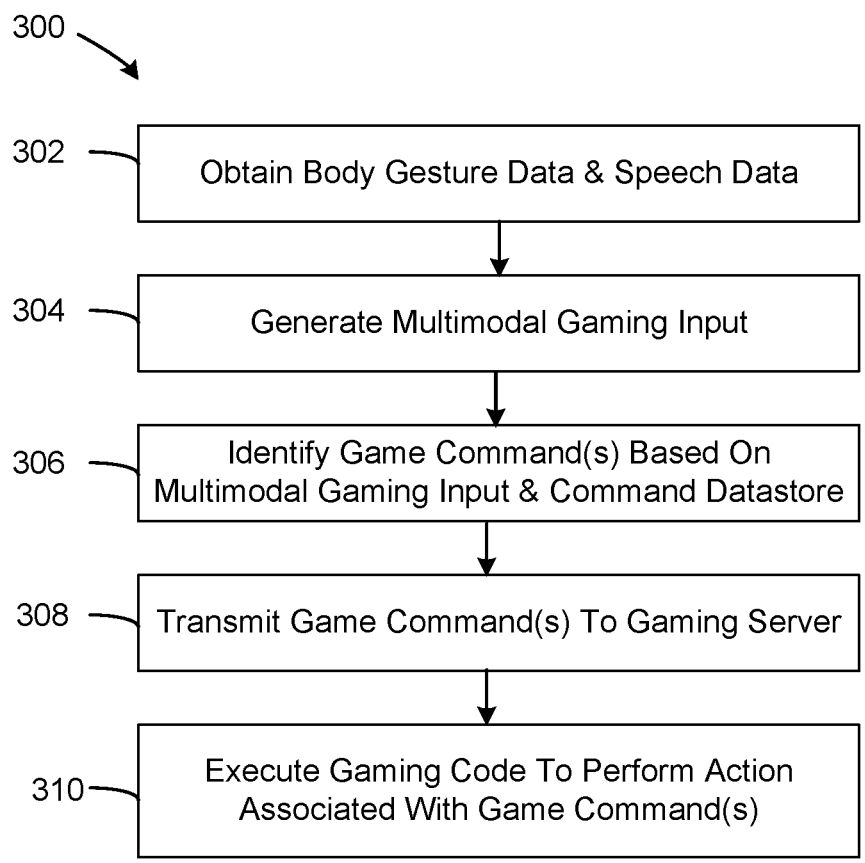
FIG. 3 is a flowchart of an example gaming routine in accordance with the present disclosure.

In yet another variation, in addition to image from cameras 112D, the body pose detector 202 may receive data indicative of body pose from other occupant detector sensors, such as pressure sensors in a vehicle seat that is able to detect a pose of the user based on pressure data. Referring to FIG. 3, an example gaming routine 300 supported by the vehicle gaming system 107 of the present disclosure is provided. With specific details provided above, at operation 302, the system 107 obtains body gesture data and speech data from the vehicle sensors. The body gesture data is indicative of one or more poses of the user 103 and the speech data is indicative of one or more recognized words or phrases spoken by the user 103 in a passenger cabin of the vehicle 100.

At operation 304, the system 107 generates a multimodal gaming input. For example, the system, combines the body gesture data and the speech data using supplemental data associated with the body gesture data and the speech data.

At operation 306, the system 107 identifies one or more game commands 114 for the video game being played from the command datastore 210 based on the multimodal gaming input. At operation 308, the system 107 transmits the one or more game commands 114 to the gaming server 102 to obtain software codes/instructions (i.e., gaming codes) associated with the one or more game commands 114. At operation 310, the system 107 executes the gaming codes to cause the video game to perform the action associated with the one or more game commands 114.

The gaming routine 300 is just one example of a control routine executed by the vehicle gaming system and may include other operations such as but not limited to, generating the pose and speech data based on inputs from the camera and microphones.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, material, manufacturing, and assembly tolerances, and testing capability.

Aspects of the present embodiments may be embodied as a system, method, or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (erasable programmable read-only memory (EPROM) or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowcharts and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A vehicle gaming system for a vehicle, the vehicle gaming system comprising:
    one or more computing devices configured to:
        obtain body gesture data indicative of one or more recognized poses of a user of a video game;
        obtain speech data indicative of one or more recognized words spoken by the user in a passenger cabin of the vehicle;
        generate a multimodal gaming input by combining the body gesture data and the speech data;
        identify one or more game commands for the video game being played from a game command datastore based on the multimodal gaming input; and
        transmit the one or more game commands to a remote gaming server to obtain gaming codes associated with the one or more game commands to cause the video game to perform an action associated with the one or more game commands.

2. The vehicle gaming system of claim 1, wherein the game command datastore is configured to associate a plurality of defined multimodal gaming inputs with a plurality of game commands.

3. The vehicle gaming system of claim 2, wherein each multimodal gaming input includes a recognized word, a recognized pose, or a combination of recognized word and a recognized pose.

4. The vehicle gaming system of claim 1, the one or more computing devices is further configured to detect the one or more recognized poses using images capturing a portion of the passenger cabin having the user and a pose detection software program.

5. The vehicle gaming system of claim 1, wherein the one or more computing devices is further configured to present images of the video game being played on a display device of the vehicle.

6. The vehicle gaming system of claim 1, wherein the body gesture data and speech data are associated based on timestamp data for each of the body gesture data and the speech data.

7. A method for providing a video gaming system for a vehicle, the method comprising:
    obtaining body gesture data indicative of one or more recognized poses of a user of a video game;
    obtaining speech data indicative of one or more recognized words spoken by the user in a passenger cabin of the vehicle;
    generating a multimodal gaming input by combining the body gesture data and the speech data;
    identifying one or more game commands for the video game being played from a game command datastore based on the multimodal gaming input; and
    transmitting the one or more game commands to a remote gaming server to obtain gaming codes associated with the one or more game commands to cause the video game to perform an action associated with the one or more game commands.

8. The method of claim 7, wherein the game command datastore is configured to associate a plurality of defined multimodal gaming inputs with a plurality of game commands.

9. The method of claim 8, wherein each multimodal gaming input includes a recognized word from among the one or more recognized words, a recognized pose, or a combination of recognized word and a recognized pose.

10. The method of claim 7 further comprising detecting the one or more recognized poses using images capturing a portion of the passenger cabin having the user and a pose detection software program.

11. The method of claim 7 further comprising presenting the video game on a display device arranged in the vehicle.

12. The method of claim 7, wherein the body gesture data and the speech data are combined based on timestamp data for each of the body gesture data and the speech data.

13. A vehicle gaming system for a vehicle, the vehicle gaming system comprising:
    one or more computing devices configured to operate as:
        a vehicle gaming input system configured to:
            obtain body gesture data indicative of one or more recognized poses of a user of a video game,
            obtain speech data indicative of one or more recognized words spoken by the user in a passenger cabin of the vehicle, generate a multimodal gaming input by combining the body gesture data and the speech data using supplemental data associated with the body gesture data and the speech data, and identify one or more game commands for the video game being played from a game command datastore based on the multimodal gaming input; and a video game control module configured to execute one or more gaming codes associated with the one or more game commands to cause the video game to perform an action associated with the one or more game commands.

14. The vehicle gaming system of claim 13, wherein the game command datastore is configured to associate a plurality of defined multimodal gaming inputs with a plurality of game commands.

15. The vehicle gaming system of claim 13, wherein each multimodal gaming input includes a recognized word, a recognized pose, or a combination of the recognized word and the recognized pose.

16. The vehicle gaming system of claim 13, wherein the vehicle gaming input system is further configured to detect the one or more recognized poses using images capturing a portion of the passenger cabin having the user and a pose detection software program.

17. The vehicle gaming system of claim 13, wherein the video game control module is further configured to present images of the video game being played on a display device of the vehicle.

18. The vehicle gaming system of claim 13, wherein the supplemental data includes timestamp data, and the body gesture data and the speech data are combined based on the timestamp data.

19. The vehicle gaming system of claim 13, wherein the vehicle gaming input system is further configured to transmit the one or more game commands to a remote gaming server to have the remote gaming server provide the one or more gaming codes.

20. The vehicle gaming system of claim 13, wherein the video game control module is further configured to transmit the one or more game commands to a remote gaming server to have the remote gaming server provide the one or more gaming codes.

* * * * *